No. 847,685. PATENTED MAR. 19, 1907.
R. J. PAVERT.
RAKE TOOTH.
APPLICATION FILED SEPT. 25, 1905.

Witnesses:

Inventor:
R. J. Pavert,
By
Attorneys

UNITED STATES PATENT OFFICE.

REMY JOHN PAVERT, OF BAKER CITY, OREGON.

RAKE-TOOTH.

No. 847,685. Specification of Letters Patent. Patented March 19, 1907.

Application filed September 25, 1905. Serial No. 279,993.

*To all whom it may concern:*

Be it known that I, REMY JOHN PAVERT, a citizen of the United States, residing at Baker City, in the county of Baker and State of Oregon, have invented new and useful Improvements in Rake-Teeth, of which the following is a specification.

My invention relates to improvements in rake-teeth.

It has for its object to relatively increase raking capacity, also strength and resisting action, as well as durability and efficiency.

To these ends it consists of certain structural features substantially as hereinafter fully disclosed, and particularly pointed out by the claims.

Figure 1:
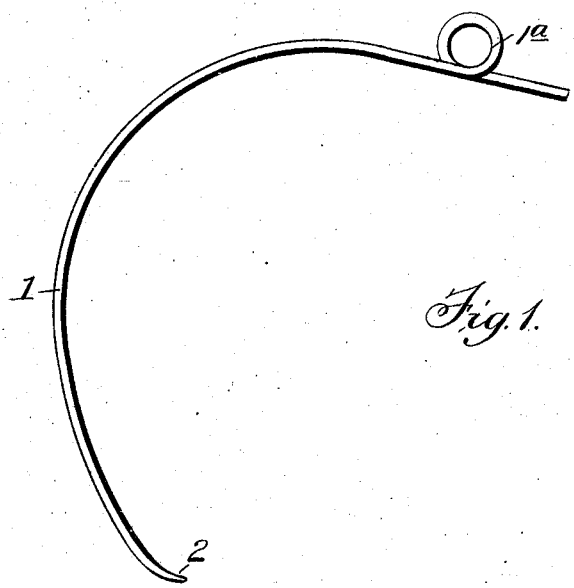
Figure 2:
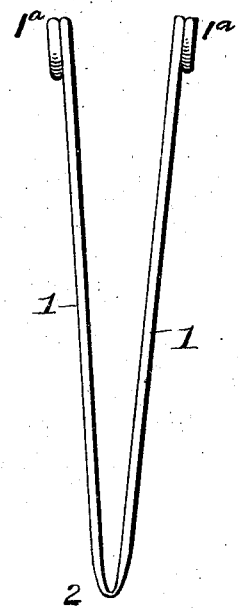

In the accompanying drawing, illustrating the preferred embodiment of my invention, Figure 1 is a side elevation of the same. Fig. 2 is a view thereof, taken in a plane at right angles to that of Fig. 1.

In making my tooth, which, of course, has the requisite curvature, I produce or form it initially of two pieces of rod-steel, for convenience designated 1 1, which, however, are subsequently in its manufacture merged or forged together at what may form the point 2 of the completed tooth, thus constituting the latter a single continuous piece. The thus formed limbs or members 1 of the tooth are so disposed or relatively arranged at the outset that they suitably converge or taper toward their point-forming end portions and correspondingly diverge or recede from each other toward their rear end portions, preferably as shown. Each of these latter portions is preferably coiled or looped upon itself, as at 1ª, to add to resiliency and requisite flexure under tensile action or stress. The tooth may be secured in position to the rake-head in any of the well-known or approved ways, which will be readily appreciated. It will be readily apparent that the tooth members or limbs 1 1 may or may not be equipped or formed with the spring-forming loops or coils without affecting the spirit of my invention and the same still remain intact.

The advantages of the thus constructed rake-tooth as disclosed above are apparent upon its face, while it is obvious that said tooth may be readily applied for practical use in a simple and effective manner, that it will not penetrate or cut into the ground, hence will leave the hay practically free of dust, and that it will more effectively rake up the hay and have an increased holding capacity.

I claim—

A horse-hay-rake tooth consisting of a continuous spring-steel piece formed into two equal-lengthed limbs converged at their lower ends and merged into a V form of point, said limbs, from the latter upward, being removed from each other in such direction that if a line were produced intersecting both of the same it would extend at right angles to the line of draft, said limbs also being both rounded in the same arc rearward, slightly upward and then downward, and finally curved forward to, and including said point.

In testimony whereof I affix my signature in presence of two subscribing witnesses.

REMY JOHN PAVERT.

Witnesses:
S. O. CORRELL,
L. D. BROWN.